(12) United States Patent
Lin

(10) Patent No.: US 10,977,103 B2
(45) Date of Patent: Apr. 13, 2021

(54) AWAKENING AN APPLICATION BY MEANS OF A MOBILE BROWSER

(71) Applicant: Advanced New Technologies Co., Ltd., George Town (KY)

(72) Inventor: Chuanjie Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/257,847

(22) Filed: Jan. 25, 2019

(65) Prior Publication Data

US 2019/0155668 A1    May 23, 2019

Related U.S. Application Data

(63) Continuation of application No. PCT/CN2017/093539, filed on Jul. 19, 2017.

(30) Foreign Application Priority Data

Jul. 27, 2016  (CN) .......................... 201610605353.3

(51) Int. Cl.
 *G06F 9/54* (2006.01)
 *G06F 9/44* (2018.01)
 (Continued)

(52) U.S. Cl.
 CPC .............. *G06F 9/548* (2013.01); *G06F 9/44* (2013.01); *G06F 9/445* (2013.01); *G06F 9/542* (2013.01); *G06F 9/546* (2013.01); *H04L 63/08* (2013.01)

(58) Field of Classification Search
 None
 See application file for complete search history.

(56) References Cited

U.S. PATENT DOCUMENTS

| 8,732,474 | B1 | 5/2014 | Perry et al. |
| 2013/0047092 | A1 | 2/2013 | She |

(Continued)

FOREIGN PATENT DOCUMENTS

| CN | 102929638 | 2/2013 |
| CN | 103365907 | 10/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Charles E Anya
(74) *Attorney, Agent, or Firm* — Fish & Richardson P.C.

(57) ABSTRACT

First call data submitted by a mobile browser when a service call for a target application (app) is initiated is received, where the first call data comprises a custom parameter used to invoke the target app and identification information of the mobile browser, and where the identification information comprises package name information of the mobile browser. Based on the custom parameter, the target app is invoked to execute a corresponding target service. The identification information of the mobile browser is transferred to the target app. In response to executing the corresponding target service, responding to second call data including the package name information of the mobile browser and submitted by the target app, to automatically return to the mobile browser.

17 Claims, 10 Drawing Sheets

(51) Int. Cl.
*G06F 9/445* (2018.01)
*H04L 29/06* (2006.01)

(56) References Cited

U.S. PATENT DOCUMENTS

| | | | | |
|---|---|---|---|---|
| 2014/0129733 | A1* | 5/2014 | Klais | H04L 67/327 |
| | | | | 709/239 |
| 2015/0016675 | A1 | 1/2015 | Kishi | |
| 2015/0127838 | A1* | 5/2015 | Li | G06F 16/9566 |
| | | | | 709/227 |
| 2015/0301873 | A1* | 10/2015 | Liang | G06F 9/44526 |
| | | | | 719/328 |
| 2016/0345038 | A1* | 11/2016 | Qian | H04N 21/2343 |

FOREIGN PATENT DOCUMENTS

| | | |
|---|---|---|
| CN | 103368907 | 10/2013 |
| CN | 104091102 | 10/2014 |
| CN | 104102537 | 10/2014 |
| CN | 104486430 | 4/2015 |
| CN | 104955005 | 9/2015 |
| CN | 106873961 | 6/2017 |
| JP | 2015018405 | 1/2015 |
| TW | 201411483 | 3/2014 |
| TW | 201502986 | 1/2015 |

OTHER PUBLICATIONS

Extended European Search Report in European Application No. 17833471.0, dated Aug. 14, 2019, 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/093539, dated Jan. 29, 2019, 10 pages (with English translation).

PCT Written Opinion of the International Searching Authority in International Application No. PCT/CN2017/093539, dated Oct. 20, 2017, 9 pages (with English translation).

International Search Report by the International Searching Authority issued in International Application No. PCT/CN2017/093539 dated Oct. 20, 2017; 10 pages.

gethub.com [online], "Android transition destination activit to the changing acency activity", Feb. 2015, retrieved on Mar. 17, 2020, retrieved from URL <https://gist.github.com/shinchit/820283281e3404839775/revisions>, 4 pages (with English translation).

* cited by examiner

```
var browserInfo={
    Info: function() {
        var ua=navigator.userAgent, version=navigator.appVersion;
        return {
            ua,
            Version,
        };
    }(),
    language: (navigator.brawserLanguage|| navigator. language), toLowerCase ()
}
```

FIG. 2

```
uaMap=[ {
    keyIos: ucbrowser,
    keyAd: ucbrowser,
    android: {packageName: com. UCMobile, activity:com. UCMobile. main. UCMobile},
    ios: ucweb-app
}, {
    keyIos: op,
    keyAd: op,
    android: {packageName: com. oupeng, browser, activity:mobi. mgeek. TunnyBrowser. MainActivity},
    ios: ucweb-app
}, {
    keyIos: qq,
    keyAd: qq,
    android: {packageName: com. tenncent.mtt,activity:com. tencent. mtt. MainActivity},
    ios: ucweb-app
}, ]
```

FIG. 3

```
zmVerifyurl=intent: //schemeapi/startapp? +patams+#Intent ; scheme=
+encodeURIComponent (zmverify) +;package=com. mobile. android. zmxy. Verify ; end;
var openIntentLink=document. getElementById( openIntentLink ) ;
if(openIntentLink) {
    openIntentLink=document. creanteElement( a )
    openIntentLink. id=openIntentLink ;
    openIntentLink. style. display=none;
    document. body. appendChild(openIntentLink ) ;
}
openIntentLink. href=zmVer
openIntentLink. dispatchEvent (zmVerify. customClickEvent ()) ;
```

FIG. 4

```
openIntentLink. href=zmVer
openIntentLink. dispatchEvent (zmVerify. customClickEvent ());

private void RunApp(String packageName, String appName) {
    try {
            Intent intent=new Intent ();
            componentName cn=new ComponentName (packageName, appName)
            intent. setComponent (cn);
            intent. setAction("android. intent. action. VIEW");
            intent. setFlags(Intent. FLAG_ACTIVITY_NEW_TASK);
            startActivity(intent);
    } catch (Exception e) {
        Logger. get (). d("start", "errer")
    }
}
```

FIG. 5

AWAKENING AN APPLICATION BY MEANS OF A MOBILE BROWSER

CROSS-REFERENCE TO RELATED APPLICATIONS

This application is a continuation of PCT Application No. PCT/CN2017/093539, filed on Jul. 19, 2017, which claims priority to Chinese Patent Application No. 201610605353.3, filed on Jul. 27, 2016, and each application is hereby incorporated by reference in its entirety.

TECHNICAL FIELD

The present application relates to the communications field, and in particular, to a method and an apparatus for invoking an application (app) by means of a mobile browser.

BACKGROUND

A common application scenario for services of an ANDROID mobile device is as follows: A user executes a service process in an app or a browser of an initiator, and the service process needs to invoke some functions of a third-party app, for example, third-party payment and third-party login.

After the user jumps from the app or the mobile browser of the initiator to the third-party app, and the app completes the corresponding service process, the user usually needs to return to the app or the mobile browser of the initiator to continue the corresponding service process.

In actual applications, when the initiator is an app on a mobile device of the user, generally the app of the initiator can be returned to based on a jump mechanism between apps in an ANDROID system. Then, when the initiator is a mobile browser on a mobile device of the user, the mobile browser cannot be automatically returned to after a third-party app completes a corresponding service.

SUMMARY

The present application provides a method for invoking an application (app) by means of a mobile browser. The method includes: receiving first call data submitted by a mobile browser when a service call for a target app is initiated, where the first call data includes a custom parameter used to invoke the target app and identification information of the mobile browser, and the identification information includes package name information of the mobile browser; invoking the target app based on the custom parameter to execute a corresponding target service, and transferring the identification information of the mobile browser to the target app; and after the target service is executed, responding to second call data carrying the package name information of the mobile browser and submitted by the target app, and returning to the mobile browser.

Optionally, the identification information of the mobile browser further includes user agent information of the mobile browser, and when the identification information of the mobile browser is the user agent information of the mobile browser, the package name information of the mobile browser is obtained through querying a system server by the target app based on the user agent information of the mobile browser.

Optionally, the second call data is an intent constructed by the target app based on the package name information of the mobile browser and used to invoke the mobile browser, and the responding to second call data carrying the package name information of the mobile browser and submitted by the target app, and returning to the mobile browser includes: receiving the intent constructed based on the package name information of the mobile browser and submitted by the target app; querying the system server for an activity component corresponding to the package name information of the mobile browser; and invoking the activity component corresponding to the mobile browser, to return to the mobile browser.

The present application further provides a method for invoking an app by means of a mobile browser. The method includes: obtaining identification information of a mobile browser when a service call for a target app is initiated, where the identification information includes package name information of the mobile browser; and submitting, to a system, first call data for the target app, where the first call data includes a custom parameter used to invoke the target app and the identification information of the mobile browser, so that the system invokes the target app based on the custom parameter, responds, when the target app completes a corresponding target service, to an intent carrying the package name information of the mobile browser and submitted by the target app, and returns to the mobile browser.

Optionally, the obtaining identification information of a mobile browser when a service call for a target app is initiated includes: obtaining user agent information of the mobile browser; and querying a system server for the package name information of the mobile browser based on the user agent information of the mobile browser.

Optionally, the identification information of the mobile browser further includes user agent information of the mobile browser, and when the identification information of the mobile browser is the user agent information of the mobile browser, the package name information of the mobile browser is obtained through querying a system server by the target app based on the user agent information of the mobile browser.

Optionally, the first call data includes a uniform resource locator (URL) defined based on a Schema protocol, and the submitting, to a system, first call data for the target app when a service call for a target app is initiated includes: defining the URL based on the Schema protocol when the service call for the target app is initiated; encapsulating, in the defined URL, the custom parameter used to invoke a target service page of the target app and the identification information of the mobile browser; and invoking a system interface, and submitting the URL to the system.

The present application further provides an apparatus for invoking an app by means of a mobile browser. The apparatus includes: a receiving module, configured to receive first call data submitted by a mobile browser when a service call for a target app is initiated, where the first call data includes a custom parameter used to invoke the target app and identification information of the mobile browser, and the identification information includes package name information of the mobile browser; an invoking module, configured to invoke the target app based on the custom parameter to execute a corresponding target service, and transfer the identification information of the mobile browser to the target app; and a responding module, configured to respond to second call data carrying the package name information of the mobile browser and submitted by the target app, and return to the mobile browser, after the target service is executed, Optionally, when the identification information of the mobile browser is the user agent information of the mobile browser, the package name information of the mobile browser is obtained through querying a system server by the target app based on the user agent information of the mobile browser.

Optionally, the second call data is an intent constructed by the target app based on the package name information of the mobile browser and used to invoke the mobile browser, and the responding module is configured to receive the intent constructed based on the package name information of the mobile browser and submitted by the target app; query the system server for an activity component corresponding to the package name information of the mobile browser; and invoke the activity component corresponding to the mobile browser, to return to the mobile browser.

The present application further provides an apparatus for invoking an app by means of a mobile browser. The apparatus includes: an acquisition module, configured to obtain identification information of a mobile browser when a service call for a target app is initiated, where the identification information includes package name information of the mobile browser; and a submitting module, configured to submit, to a system, first call data for the target app, where the first call data includes a custom parameter used to invoke the target app and the identification information of the mobile browser, so that the system invokes the target app based on the custom parameter, responds, when the target app completes a corresponding target service, to an intent carrying the package name information of the mobile browser and submitted by the target app, and returns to the mobile browser.

Optionally, the acquisition module is configured to obtain user agent information of the mobile browser; and query a system server for the package name information of the mobile browser based on the user agent information of the mobile browser.

Optionally, the identification information of the mobile browser further includes user agent information of the mobile browser, and when the identification information of the mobile browser is the user agent information of the mobile browser, the package name information of the mobile browser is obtained through querying a system server by the target app based on the user agent information of the mobile browser.

Optionally, the first call data includes a URL defined based on a Schema protocol, and the submitting module is configured to define the URL based on the Schema protocol when the service call for the target app is initiated; encapsulate, in the defined URL, the custom parameter used to invoke a target service page of the target app and the identification information of the mobile browser; and invoke a system interface, and submit the URL to the system.

In the present application, when the mobile browser of a service initiator initiates the service call for the target app, the call data carries the package name information of the mobile browser, and the system transfers the package name information to the target app. Therefore, the target app can submit the intent carrying the package name information to the system after completing the corresponding target service, so that the system responds to the intent and returns to the mobile browser of the service initiator. After completing the service by invoking the third-party target app, the user can automatically return to the mobile browser of the initiator instead of manually selecting the mobile browser to be returned to, thereby improving user experience.

BRIEF DESCRIPTION OF DRAWINGS

FIG. 2 is an example of JavaScript code for obtaining user agent information of a mobile browser by a service front-end page, according to an implementation of the present application;

FIG. 3 is a Schematic storage diagram illustrating a service list maintained on a system server, according to an implementation of the present application;

FIG. 4 is an example of JavaScript code for invoking an ALIPAY app by using a URL defined based on a Schema protocol, according to an implementation of the present application;

FIG. 5 is an example of JavaScript code for constructing an intent by a target app based on a package name of a mobile browser of a service initiator, according to an implementation of the present application;

DESCRIPTION OF IMPLEMENTATIONS

Figure 1:
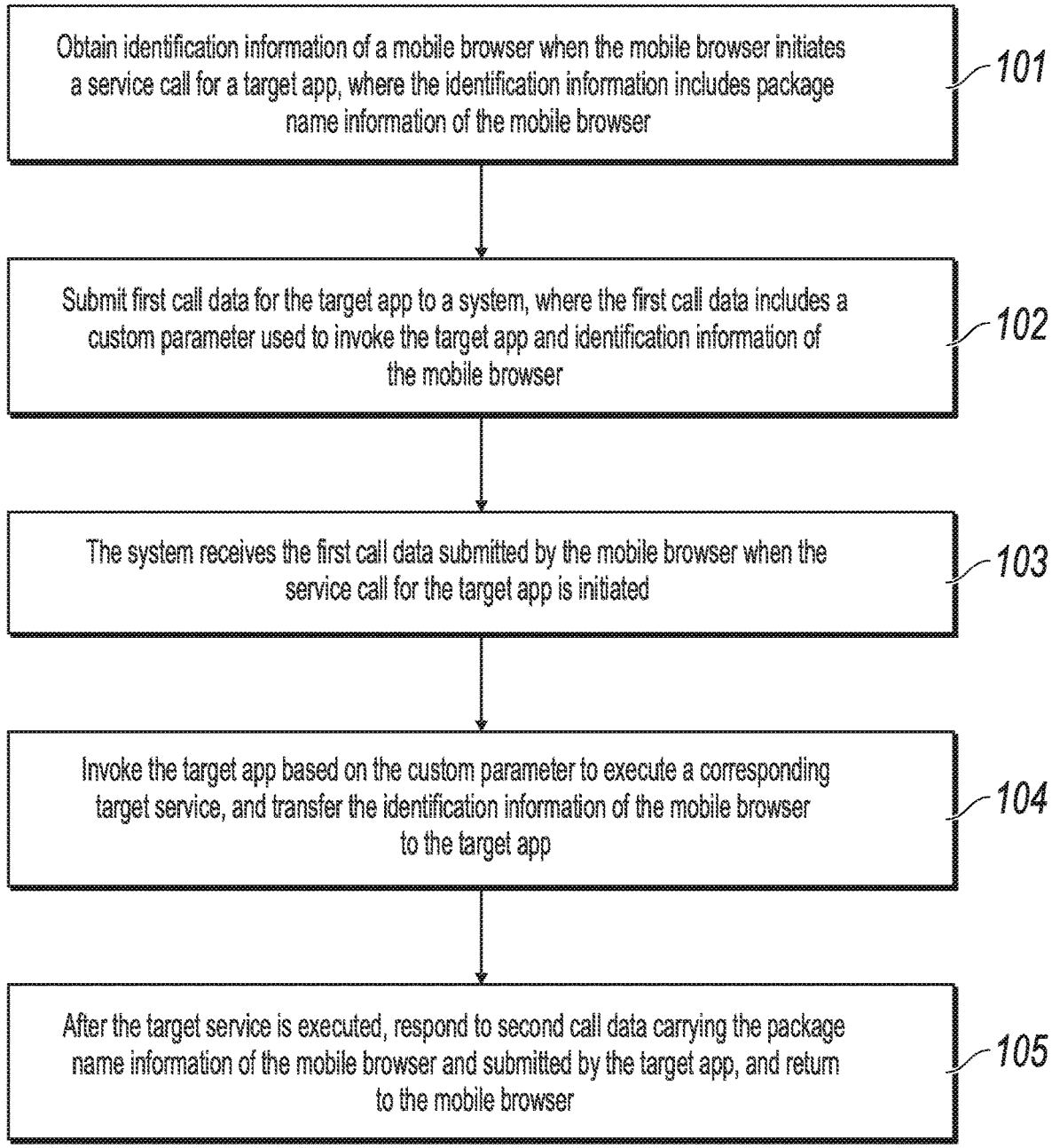
FIG. 1 is a flowchart illustrating a method for invoking an application (app) by means of a mobile browser, according to an implementation of the present application.

In an ANDROID system, when a mobile browser of a service initiator initiates a service call for a third-party application (app), the mobile browser can usually define a URL based on a Schema protocol, and invoke a service interface of the third-party app by using the defined URL, to execute a corresponding service process.

The Schema protocol is an ANDROID system compatible protocol.

When initiating the service call for the third-party app, the mobile browser can define, based on the Schema protocol, the URL used to invoke the app, encapsulate, in the URL, a custom parameter used to invoke a service interface specified by the app, and then submit the URL to the ANDROID system by using a system application programming interface (API). After receiving the URL, the ANDROID system can parse the Schema protocol, and invoke, by using the custom parameter encapsulated in the URL, the service interface specified by the app, to execute the service call.

After user initiates the service call for the third-party app by using the mobile browser of the service initiator, and a corresponding service process is completed in the invoked specified service interface of the app, the user usually needs to return to the mobile browser of the service initiator to continue an original service process.

For example, the user initiates a service call for a third-party payment app by using a shopping page in the mobile browser. In this case, after payment is completed in an invoked payment page of the app, the user usually needs to return to a shopping complete interface in the mobile browser to continue a subsequent process.

On an existing ANDROID platform, an intent is usually constructed to implement a jump between apps.

The intent is a method defined for communication between components of ANDROID apps in the ANDROID system. The intent is responsible for describing an action when two components execute an operation, and data and additional data related to the action, and is used to provide related information for mutual calls between components.

After the user initiates the service call for the third-party app by using the mobile browser of the service initiator, and the corresponding service process is completed in the invoked specified service interface of the app, the app can submit, to the ANDROID system, an intent used to jump to the mobile browser. The ANDROID system can parse out a parameter carried in the intent, perform intent matching, and invoke an activity component of another app corresponding to a matching intent, to jump to a specified page of the another app.

However, because a URL defined by the mobile browser based on the Schema protocol usually does not support carrying source information of an app, when the ANDROID system performs intent matching based on the parameter carried in the intent submitted by the app, it is possible that the ANDROID system cannot accurately obtain the mobile browser of the service initiator through matching due to insufficient information of the mobile browser.

In this case, the ANDROID system usually invokes all mobile browsers in the system, and pops up a browser selection window for the user, so that the user manually selects the mobile browser to be returned to.

It can be seen that the previous solution has at least the following disadvantages.

In a first aspect, the ANDROID system cannot automatically return to the mobile browser of the service initiator, and therefore, the user needs to perform manual selection. As such, the tedious operations can cause poor user experience.

In a second aspect, the ANDROID system has various types of mobile browsers (for example, a native browser default in the system, a QQ browser, a UC browser, and a 360 browser), but the user is not familiar with these browsers. Consequently, a mobile browser manually selected by the user may not be the mobile browser of the original service initiator.

In a third aspect, web apps such as a mobile browser usually use a cookie to record a user operation status (for example, a user's login status and a security control check status). If a mobile browser selected by the user is not the mobile browser of the original service initiator, the user needs to resume these statuses through additional operations when continuing the service process in the mobile browser. Consequently, operations performed by the user increase and can affect user experience.

In view of this, the present application provides a method for invoking an app by means of a mobile browser. When the mobile browser of the service initiator initiates a service call for a target app, call data carries package name information of the mobile browser, and the system transfers the package name information to the target app. Therefore, the target app can submit an intent carrying the package name information to the system after completing a corresponding target service, so that the system responds to the intent, and returns to the mobile browser of the service initiator. After completing the service by invoking the third-party target app, the user can automatically return to the mobile browser of the initiator instead of manually selecting the mobile browser to be returned to, thereby improving user experience.

The following describes the present application by using specific implementations with reference to specific application scenarios.

FIG. 1 shows a method for invoking an app by means of a mobile browser, according to an implementation of the present application. The method is applied to a mobile device. The mobile device can carry an ANDROID system. A mobile browser and at least one target app are installed in the ANDROID system. The mobile browser interacts with the ANDROID system, to perform the following steps:

Step 101: Obtain identification information of the mobile browser when the mobile browser initiates a service call for a target app, where the identification information includes package name information of the mobile browser.

In the present implementation, the service call from the mobile browser for the target app can be manually triggered by the user in a local service interface of the mobile browser.

In a shown implementation, a user option available for the user to operate can be provided in advance in the local service interface of the mobile browser. The user option can be an interaction button or a link. For example, the user initiates a service call in a local shopping page of the mobile browser for an ALIPAY app to execute a payment process. The user option can be an interaction button "use ALIPAY for payment" provided in the shopping page, or can be a link that can trigger a jump to a payment page of the ALIPAY app.

The user can touch the user option in the service interface, to trigger the mobile browser to initiate a service call for a third-party target app. After listening to the user's touch event for the user option at background, the mobile browser can immediately initiate a service interface call for the target app by using the ANDROID system.

After receiving the call request for a local service interface, the target app can return a URL of a corresponding service front-end page to the mobile browser. The service browser can jump to the corresponding service front-end page after receiving the URL.

The service front-end page is a web page loaded on the mobile browser and used to execute a service in the third-party target app. In actual applications, a specific function of the service front-end page can be jointly developed by a supplier of the mobile browser and a supplier of the third-party target app.

Still in the implementation that the user initiates a service call in a local shopping page of the mobile browser for an ALIPAY app to execute a payment process, the service front-end page can be a service entry interface jointly developed by the supplier of the mobile browser and the supplier of the ALIPAY app and used to invoke the ALIPAY app to perform payment. Information about details such as a payment amount and a to-be-purchased product can be displayed in the service entry interface. The user can check the current payment based on the information displayed in the interface.

In the present implementation, after the mobile browser jumps to the service front-end page, the service front-end page, as a front end of service execution, can obtain the identification information of the mobile browser serving as a service initiator.

During implementation, the identification information of the mobile browser can include a package name (package name information) or user agent information of the mobile browser. The package name is a unique identifier defined by the ANDROID system for each app in the system. The user agent information generally records information such as a name and a version of a browser. The version information of the mobile browser generally includes information such as a system environment of the mobile browser.

In a shown implementation, when the identification information of the mobile browser is the user agent information, the service front-end page can directly obtain the user agent information of the mobile browser by executing JavaScript code loaded on the service front-end page.

For example, FIG. 2 is an example of JavaScript code for obtaining user agent information of a mobile browser by a service front-end page, according to the present implementation.

In the code example shown in FIG. 2, ua=navigator.userAgent is used to return a name of a mobile browser, and version=navigator.appVersion is used to return information about a system environment of a mobile browser.

In another shown implementation, when the identification information of the mobile browser is the package name, the service front-end page can use the obtained user agent information as an index to query a system server of the ANDROID system for the package name of the mobile browser when the service front-end page obtains the package name of the current mobile browser.

A service list storing a mapping relationship between user agent information of a mobile browser, a package name of the mobile browser, and an activity component of the mobile browser can be maintained in the system server in advance.

After obtaining the user agent information of the current mobile browser, the service front-end page can send the user agent information of the mobile browser to the system server.

When sending the user agent information of the mobile browser to the system server, the service front-end page can upload the user agent information of the mobile browser to the system server in a form of a request by using an AJAX interface between the service front-end page and the system server.

After receiving the user agent information sent by the service front-end page, the system server can use the user agent information as an index to search the service list for the corresponding package name, and then return the obtained package name to the service front-end page.

For example, FIG. 3 is a Schematic storage diagram illustrating a service list maintained on a system server, according to the present implementation.

When searching for the corresponding package name based on the user agent information, the system server can first read the user agent information to obtain version information of the mobile browser. The version information of the mobile browser generally includes information such as a version of the mobile browser and the system environment. The system server can determine a type of the mobile browser from the service list based on the obtained information about the system environment. For example, the system server can determine whether a bottom-layer environment of the mobile browser is based on the ANDROID system or an IOS system. After determining the type of the mobile browser, the system server can further search for the corresponding package name based on the name of the mobile browser in the user agent information. In this case, the obtained package name is the unique identifier of the mobile browser in the ANDROID system. The system server can return the package name to the service front-end page.

Step 102: Submit first call data for the target app to a system, where the first call data includes a custom parameter used to invoke the target app and the identification information of the mobile browser.

Step 103: The system receives the first call data submitted by the mobile browser when the service call for the target app is initiated.

In a shown implementation, the first call data can be a URL defined by the service front-end page based on a Schema protocol.

When the service front-end page initiates the service call for the target app, the service front-end page can define, based on the Schema protocol, a URL used to invoke the target app, and encapsulate, in the URL, a predefined custom parameter used to invoke a target service page of the target app.

In addition, the service front-end page can further use the obtained identification information of the current mobile browser as an additional parameter that needs to be transferred to the target app, and encapsulate the identification information in the URL. Certainly, in actual applications, the Schema protocol supported by the ANDROID system can be improved, so that the Schema protocol can support carrying source information of an app of the service initiator by default, such as a package name. As such, the URL defined based on the Schema protocol carries the package name of the mobile browser of the service initiator by default instead of encapsulating the package name as the additional parameter.

For example, the user initiates a service call for the ALIPAY app based on an intent protocol by using the mobile browser, and the identification information of the mobile browser is the package name. The URL defined by the service front-end page based on the Schema protocol and used to invoke the ALIPAY app can be as follows:
   url=intent://schemeapi/startapp?+patams+#Intent;
scheme=+encodeURIComponent(zmverify)+;
package=com.mobile.android;

In the URL, "intent://schemeapi/startapp" is a protocol header defined based on a scheme. "+patams+#Intent; scheme=+encodeURIComponent(zmverify)" after the parameter identifier ? is a custom parameter used to invoke an activity component corresponding to a payment page in the ALIPAY app. The ANDROID system can match the above parameters with an intent corresponding to the activity component of the ALIPAY app and registered in a system configuration file, to locate the activity component that needs to be invoked. "package=com.mobile.android;" is the package name of the mobile browser that needs to be transferred to the ALIPAY app.

In the present implementation, the URL defined by the service front-end page based on the Schema protocol can be submitted by the service front-end page to the ANDROID system in a form of a request by invoking an API system interface.

The user can manually trigger the service front-end page to submit the service call for the target app to the ANDROID system.

In a shown implementation, a user button available for the user to operate can be provided in advance on the service front-end page. The user can touch the user button to trigger the service front-end page to submit the URL to the ANDROID system in a form of a request.

Still in the implementation that the user initiates a service call in a local shopping page of the mobile browser for the ALIPAY app to execute a payment process, and the identification information of the mobile browser of the service initiator is the package name, a user button "use ALIPAY for payment" can be provided on the service front-end page. The user button can be bound with an execution method defined in JavaScript code shown in FIG. 4.

The user can "click" the user button to trigger the service front-end page to invoke the execution method bound with the user button and invoke the API system interface to submit the URL to the ANDROID system in a form of a request.

In the JavaScript code shown in FIG. 4, zmVerifyUrl is the URL defined by the service front-end page based on the Schema protocol and used to invoke the ALIPAY app; the label "a" corresponds to the user button; "openIntentLink.dispatchEvent (ZmVerify.customClickEvent ( ))" indicates that the label "a" is bound with a user click event, and when the user click event corresponding to the label "a" for the user button is listened to, the URL is submitted to the ANDROID system in a form of a request.

After receiving the URL submitted by the service front-end page, the ANDROID system can parse the URL submitted by the service front-end page, to obtain the custom parameter and the identification information of the mobile browser of the service initiator that are carried in the URL.

Step 104: Invoke the target app based on the custom parameter to execute a corresponding target service, and transfer the identification information of the mobile browser to the target app.

In this implementation, after the ANDROID system parses the URL submitted by the service front-end page and obtains the custom parameter and the identification information of the mobile browser of the service initiator in the URL:the ANDROID system can match the custom parameter in the URL with the intent corresponding to the activity component of the ALIPAY app and registered in the system configuration file (for example, the system configuration file can be an AndroidManifest.xml file in the ANDROID system), to locate the activity component that needs to be invoked. When any intent registered in the system file is obtained after the matching, the ANDROID system can immediately invoke the activity component corresponding to the intent to jump to the target service page of the target app.

In addition, after invoking the activity component corresponding to the target app and corresponding to the matching intent, the ANDROID system can further transfer, to the target app, the identification information of the mobile browser of the service initiator that is encapsulated in the URL.

It is worthwhile to note that, if the identification information of the mobile browser of the service initiator that is submitted by the service front-end page to the ANDROID system is the user agent information, the target app can send the received user agent information to the system server of the ANDROID system. The system server uses the user agent information as an index, searches, for the corresponding package name, the service list storing the mapping relationship between user agent information of a mobile browser, a package name of the mobile browser, and an activity component of the mobile browser and maintained in the system server, and returns the found package name to the target app.

Step 105: After the target service is executed, respond to second call data carrying the package name information of the mobile browser and submitted by the target app, and return to the mobile browser.

In a shown implementation, the second call data can be an intent constructed by the target app based on the package name information of the mobile browser and used to invoke the mobile browser of the service initiator.

When the ANDROID system invokes the activity component corresponding to the matching intent and jumps to the target service page of the target app, the user can execute a subsequent service process on the target service page.

For example, when the target app is the ALIPAY app, the target service page can be the payment page of the ALIPAY app, and the user can enter a payment password in the payment page to complete payment.

After the user completes the service process of the target service in the target service page:

the target app can push a service execution result to the mobile browser of the service initiator, to trigger the mobile browser to jump to a service end page.

In addition, the target app can construct the intent based on the package name of the mobile browser of the service initiator that is transferred by the ANDROID system, or the package name of the mobile browser of the service initiator that is found by the system server, and submits the intent to the ANDROID system to trigger the ANDROID system to invoke the activity component of the mobile browser of the initiator, to return to the mobile browser of the service initiator.

For example, FIG. 5 is an example of JavaScript code for constructing an intent by a target app based on a package name of a mobile browser of a service initiator, according to the present implementation. In the code example shown in FIG. 5, "new ComponentName (Package Name, appName)" is a full name of the constructed intent; "android.intent.action.View" is a standard intent supported by the ANDROID system and means to open a browser program and show the URL; "intent.FLAG_ACTIVITY_NEW_TASK" is also a standard intent supported by the ANDROID system and means to invoke an activity component corresponding to the package name and put the activity component to the top of an activity stack maintained in the ANDROID system (the activity component is an interactive window displayed in a system, and putting the activity component to the top of the stack means to move, to the uppermost layer of an ANDROID system desktop, the interactive window corresponding to the activity component).

In the code example shown in FIG. 5, the package name of the browser of the service initiator is specified in ComponentName, and the ANDROID system can accurately locate, based on the package name, the activity component that needs to be invoked. Therefore, the ANDROID system executes an explicit intent call (intent calls include an explicit call and an implicit call, where the explicit call means that an activity component of a to-be-invoked party is explicit, while the implicit call means that an activity component of a to-be-invoked party is implicit and the activity component is located and invoked through performing matching of attribute parameters defined in an intent).

In the present implementation, after receiving the intent submitted by the target app after the service process of the target service is completed, the ANDROID system can parse the intent to obtain the package name of the mobile browser of the service initiator that is carried in the intent, and then upload the package name to the system server. The system server uses the package name as an index, searches, for the activity component of the mobile browser, the service list storing the mapping relationship between user agent information of a mobile browser, a package name of the mobile browser, and an activity component of the mobile browser and maintained in the system server, and returns a found name of the activity component to the ANDROID system.

After obtaining the activity component of the mobile browser of the service initiator, the ANDROID system can respond to the intent submitted by the target app, invoke the activity component of the mobile browser, and put the activity component of the mobile browser to the top of the activity stack maintained in the ANDROID system, to return to the mobile browser of the service initiator. In this case, the interactive window of the mobile browser is displayed at the uppermost layer of the system desktop. After the user completes the service process of the third party on the target service page of the target app, the system returns to the service end page of the mobile browser of the service initiator.

When responding to the intent submitted by the target app, the ANDROID system can accurately locate the activity component of the mobile browser of the service initiator that needs to be invoked by using package name, the system can execute the explicit intent call, and automatically jump to the service end page of the mobile browser of the service initiator. In the entire process, the system does not need to pop up the browser selection window for the user to manually select the mobile browser to be returned to, thereby improving user experience.

In the above implementation, when the mobile browser of the service initiator initiates the service call for the target app, the call data carries the package name information of the mobile browser, and the system transfers the package name information to the target app. Therefore, the target app can submit the intent carrying the package name information to the system after completing the corresponding target service, so that the system responds to the intent and returns to the mobile browser of the service initiator.

Because the intent submitted by the target app carries the package name information of the mobile browser of the service initiator, the ANDROID system can accurately locate, based on the package name information, the activity component that needs to be invoked. Therefore, when responding to the intent, the ANDROID system can execute the explicit intent call and automatically jump to the mobile browser of the service initiator instead of popping up the browser selection window for the user to manually select the mobile browser to be returned to, thereby simplifying the operations. In addition, the user does not need to perform additional operations if the user manually selects another browser different from the mobile browser of the service initiator to resume user operation statuses recorded by a browser, thereby improving user experience.

The present application further provides an apparatus implementation corresponding to the previous method implementation.

Figure 6:
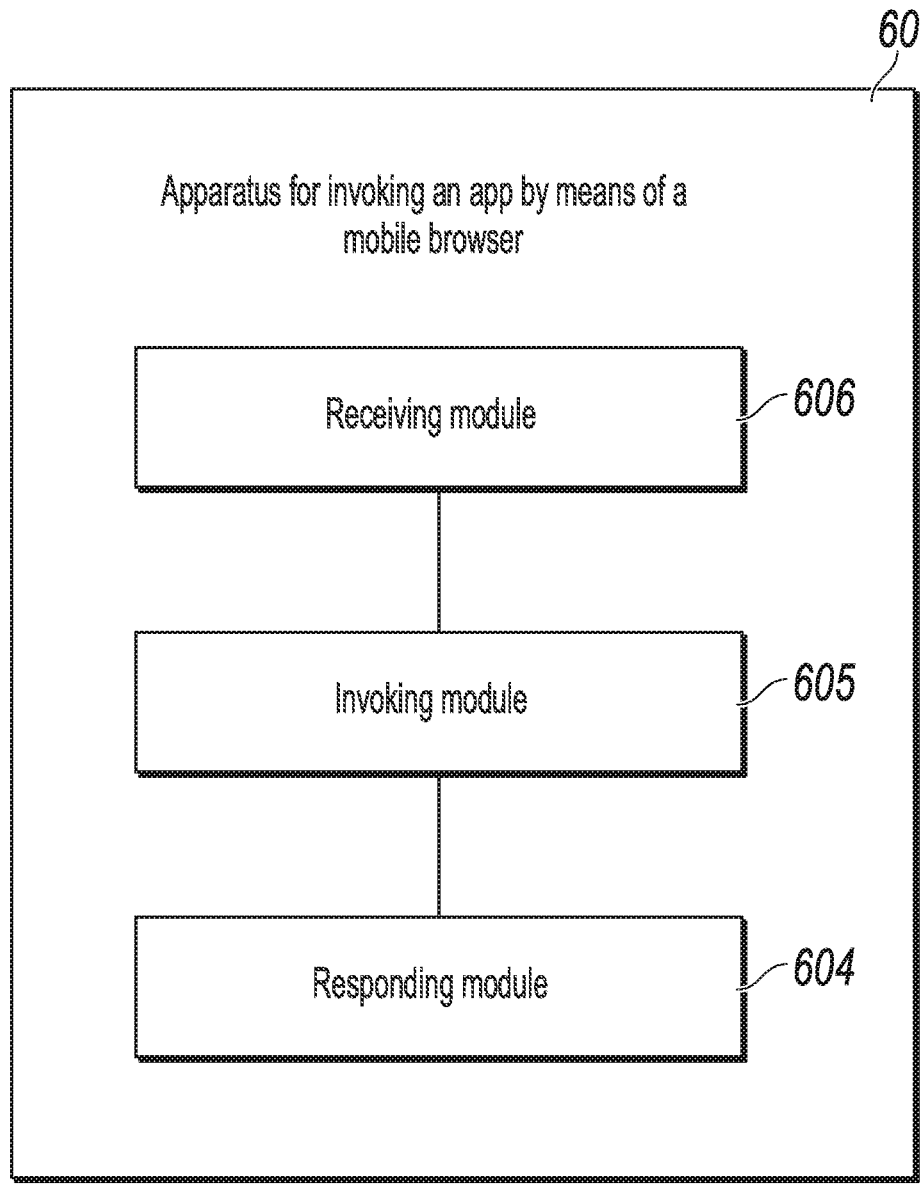
FIG. 6 is a logical block diagram illustrating an apparatus for invoking an app by means of a mobile browser, according to an implementation of the present application.
Figure 7:
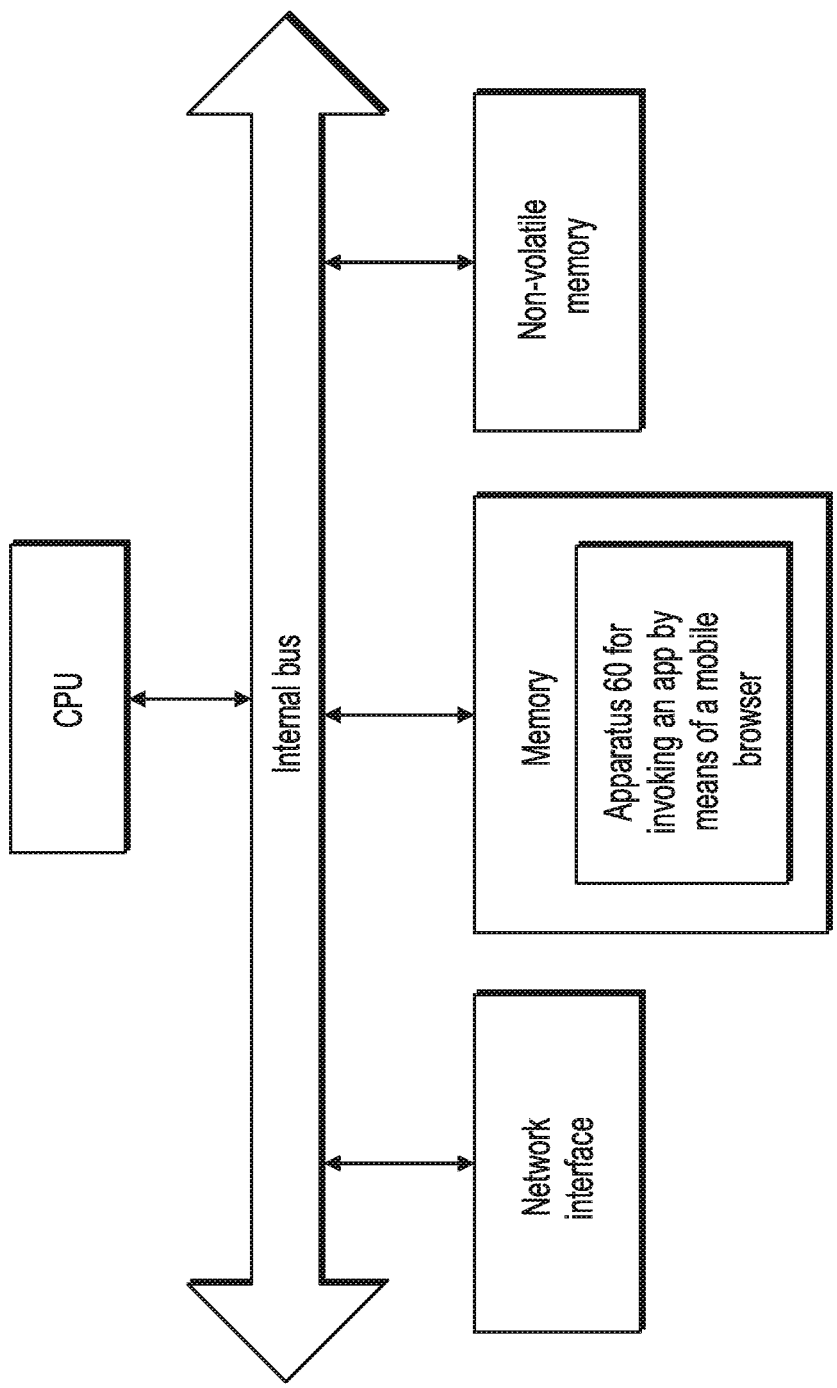
FIG. 7 is a hardware structural diagram illustrating a mobile device carrying an apparatus for invoking an app by means of a mobile browser, according to an implementation of the present application.

Referring to FIG. 6, the present application provides an apparatus 60 for invoking an app by means of a mobile browser. The apparatus 60 is applied to an ANDROID system. Referring to FIG. 7, a hardware architecture involved in a mobile device carrying the ANDROID system usually includes a CPU, a memory, a non-volatile memory, a network interface, an internal bus, etc. In an example of a software implementation, the apparatus 60 for invoking an app by means of a mobile browser may usually be understood as a logical apparatus of a software and hardware combination obtained after the CPU runs a computer program loaded in the memory. The apparatus 60 includes: a receiving module 601, configured to receive first call data submitted by a mobile browser when a service call for a target app is initiated, where the first call data includes a custom parameter used to invoke the target app and identification information of the mobile browser, and the identification information includes package name information of the mobile browser; an invoking module 602, configured to invoke the target app based on the custom parameter to execute a corresponding target service, and transfer the identification information of the mobile browser to the target app; and a responding module 603, configured to: respond to second call data carrying the package name information of the mobile browser and submitted by the target app and return to the mobile browser, after the target service is executed.

In the present implementation, when the identification information of the mobile browser is user agent information of the mobile browser, the package name information of the mobile browser is obtained through querying a system server by the target app based on the user agent information of the mobile browser.

In the present implementation, the second call data is an intent constructed by the target app based on the package name information of the mobile browser and used to invoke the mobile browser.

The responding module 603 is configured to receive the intent constructed based on the package name information of the mobile browser and submitted by the target app; query the system server for an activity component corresponding to the package name information of the mobile browser; and invoke the activity component corresponding to the mobile browser, to return to the mobile browser.

Figure 8:
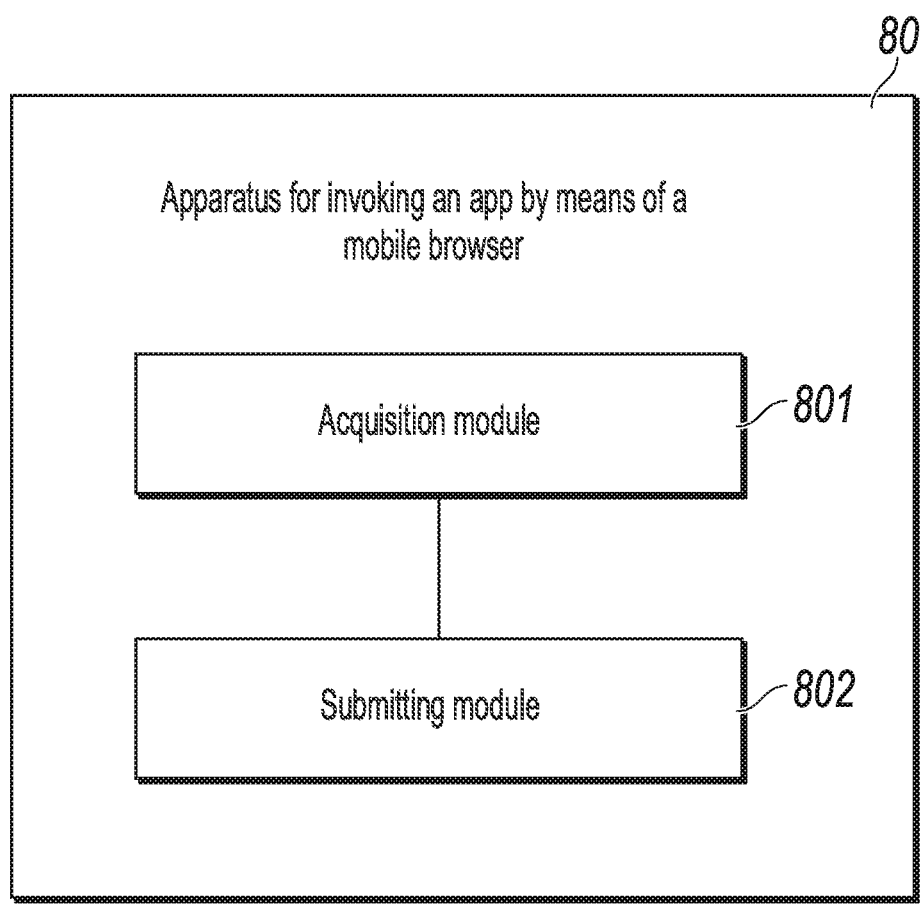
FIG. 8 is a logical block diagram illustrating another apparatus for invoking an app by means of a mobile browser, according to an implementation of the present application.
Figure 9:
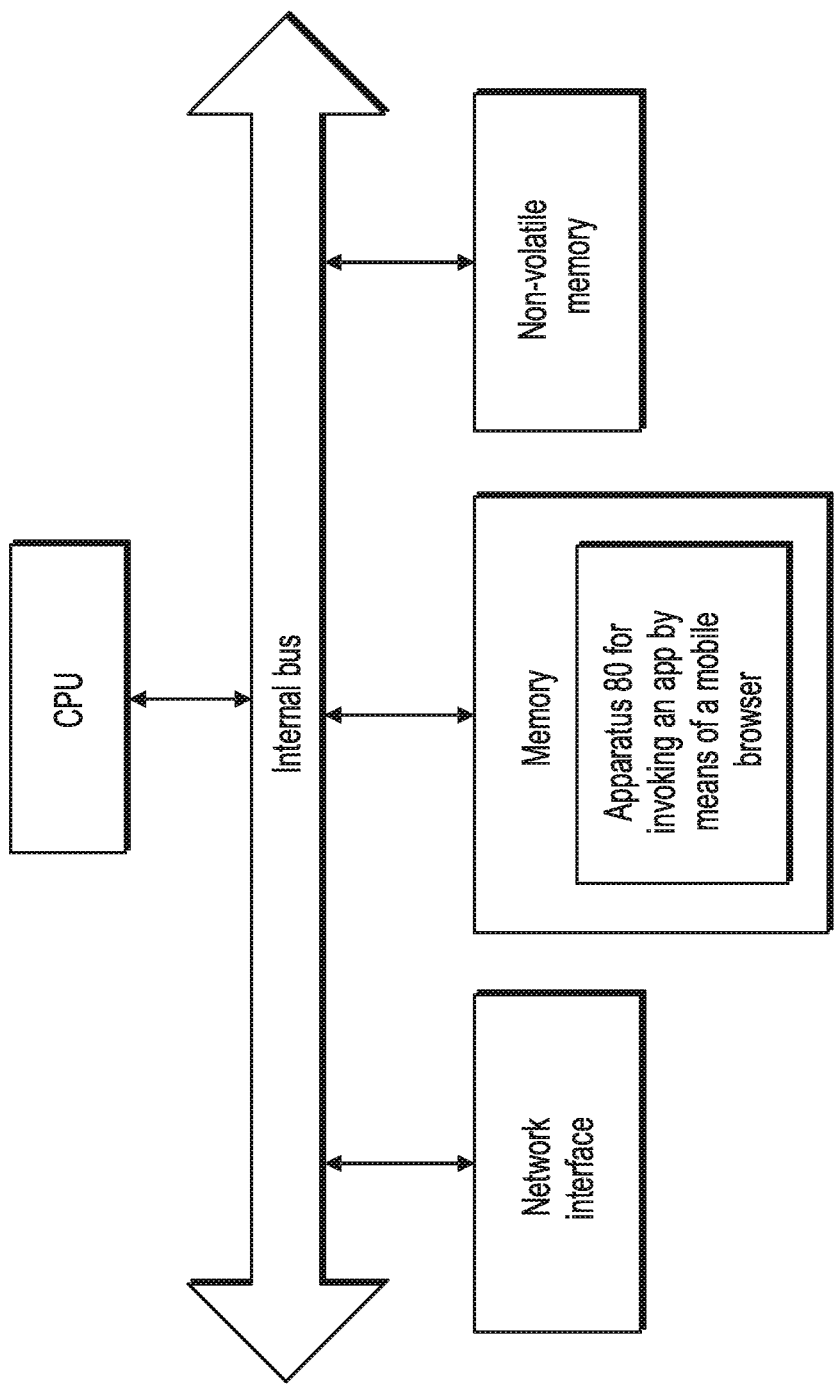
FIG. 9 is a hardware structural diagram illustrating a mobile device carrying another apparatus for invoking an app by means of a mobile browser, according to an implementation of the present application.

Referring to FIG. 8, the present application provides an apparatus 80 for invoking an app by means of a mobile browser. The apparatus 80 is applied to a mobile browser. Referring to FIG. 9, a hardware architecture involved in a mobile device carrying the mobile browser usually includes a CPU, a memory, a non-volatile memory, a network interface, an internal bus, etc. In an example of a software implementation, the apparatus 90 for invoking an app by means of a mobile browser may usually be understood as a logical apparatus of a software and hardware combination obtained after the CPU runs a computer program loaded in the memory. The apparatus 90 includes: an acquisition module 801, configured to obtain identification information of the mobile browser when a service call for a target app is initiated, where the identification information includes package name information of the mobile browser; and a submitting module 802, configured to submit, to a system, first call data for the target app, where the first call data includes a custom parameter used to invoke the target app and the identification information of the mobile browser, so that the system invokes the target app based on the custom parameter, responds, when the target app completes a corresponding target service, to an intent carrying the package name information of the mobile browser and submitted by the target app, and returns to the mobile browser.

In the present implementation, the acquisition module 801 is configured to: obtain user agent information of the mobile browser; and query a system server for the package name information of the mobile browser based on the user agent information of the mobile browser.

In the present implementation, the identification information of the mobile browser further includes user agent information of the mobile browser.

When the identification information of the mobile browser is the user agent information of the mobile browser, the package name information of the mobile browser is obtained through querying a system server by the target app based on the user agent information of the mobile browser.

In the present implementation, the first call data includes a URL defined based on a Schema protocol.

The submitting module 802 is configured to define the URL based on the Schema protocol when the service call for the target app is initiated; encapsulate, in the defined URL, the custom parameter used to invoke a target service page of the target app and the identification information of the mobile browser; and invoke a system interface, and submit the URL to the system.

A person skilled in the art can easily figure out another implementation solution of the present application after considering the present specification and practicing the disclosed invention here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are pointed out by the following claims.

It should be understood that the present application is not limited to the specific structures described above and shown in the accompanying drawings, and modifications and changes may be made without departing from the scope of the present application. The scope of the present application is limited only by the appended claims.

The previous descriptions are merely examples of implementations of the present application, but are not intended to limit the present application. Any modification, equivalent replacement, or improvement made without departing from the spirit and principle of the present application should fall within the protection scope of the present application.

Figure 10:
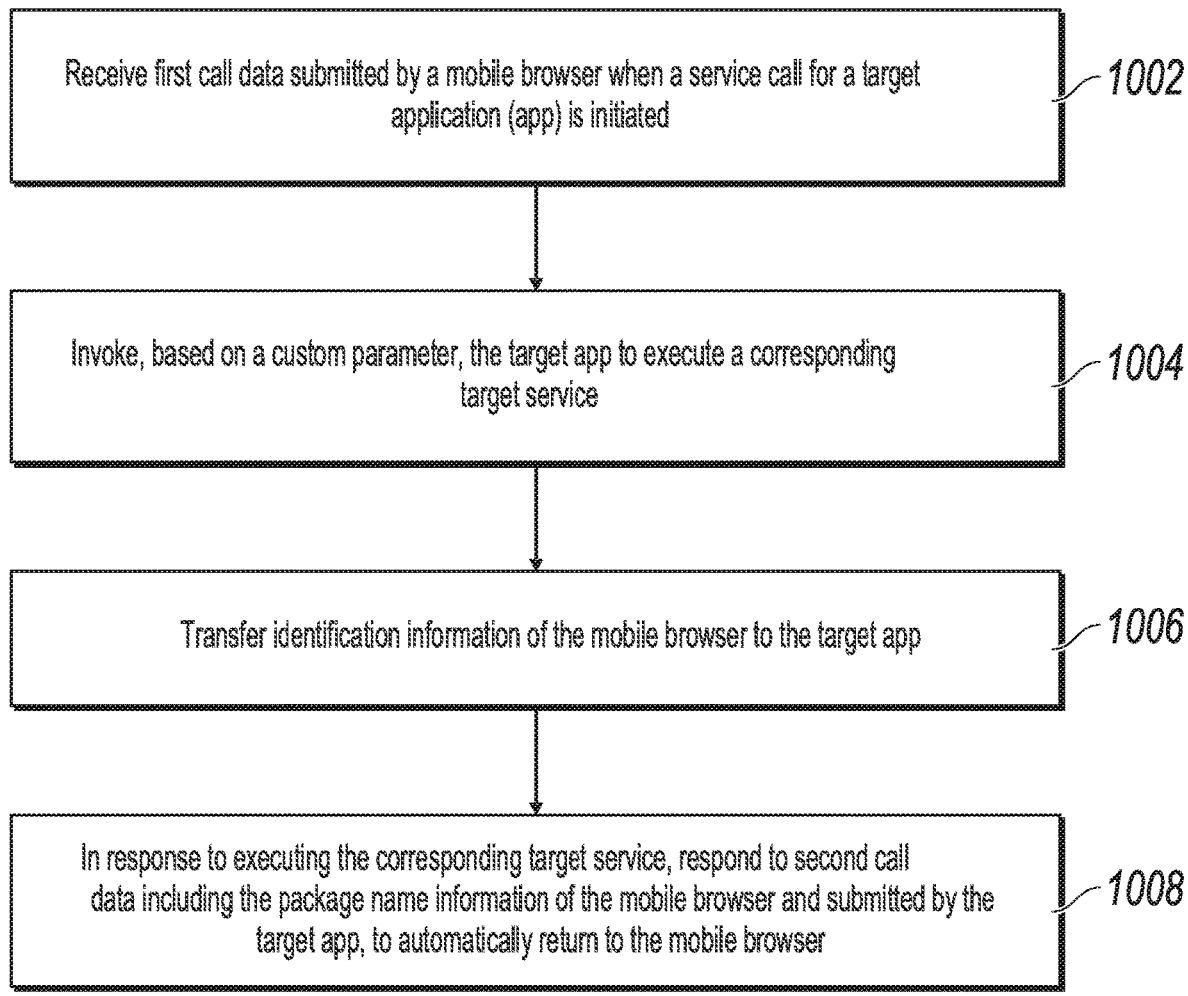
FIG. 10 is a flowchart illustrating an example of a computer-implemented method for invoking an app by means of a mobile browser, according to an implementation of the present disclosure.

FIG. 10 is a flowchart illustrating an example of a computer-implemented method 1000 for invoking an app by means of a mobile browser, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, first call data submitted by a mobile browser when a service call for a target application (app) is initiated is received, where the first call data comprises a custom parameter used to invoke the target app and identification information of the mobile browser, and where the identification information comprises package name information of the mobile browser.

In some implementations, receiving the first call data comprises: 1) retrieving identification information of a mobile browser when a service call for the target app is initiated; and 2) submitting the first call data for the target app.

In some implementations, retrieving the identification information comprises: 1) retrieving user agent information of the mobile browser; and 2) querying, based on the user agent information of the mobile browser, a system server for the package name information of the mobile browser.

In some implementations, the package name information of the mobile browser comprises version information of the mobile browser.

In some implementations, the identification information of the mobile browser further comprises user agent information of the mobile browser; and in response to determining that the identification information of the mobile browser is the user agent information of the mobile browser, retrieving, based on the user agent information of the mobile browser and by the target app, the package name information of the mobile browser.

In some implementations, the first call data comprises a URL defined based on a Schema protocol; and submitting the first call data for the target app comprises: 1) defining the URL based on the Schema protocol when the service call for the target app is initiated; 2) parsing the URL to obtain the custom parameter and the identification information of the mobile browser; 3) encapsulating, in the URL, the custom parameter and the identification information of the mobile browser, wherein the custom parameter is used to invoke a target service page of the target app; and 4) invoking a system interface to submit the URL. From 1002, method 1000 proceeds to 1004.

At 1004, based on the custom parameter, the target app is invoked to execute a corresponding target service. From 1004, method 1000 proceeds to 1006.

At 1006, the identification information of the mobile browser is transferred to the target app. From 1006, method 1000 proceeds to 1008.

At 1008, in response to executing the corresponding target service, responding to second call data including the package name information of the mobile browser and submitted by the target app, to automatically return to the mobile browser.

In some implementations, the second call data is an intent constructed, based on the package name information of the mobile browser, by the target app and used to invoke the mobile browser; and responding to the second call data comprises: 1) receiving the intent; 2) querying a system server for an activity component corresponding to the package name information of the mobile browser; and 3) invoking the activity component to return to the mobile browser. After 1008, method 1000 can stop.

Implementations of the described subject matter can provide one or more technical effects or technical features. For example, after completing a service by invoking a third-party target app, the user device can automatically return to the mobile browser of the initiator instead of requiring manual selection of a mobile browser, thereby improving and enhancing overall system processing and response speed. As the user device can automatically be returned to a mobile browser, data security can be enhanced by minimizing physical user interactions with various browser (or other) applications and mitigating or eliminating possible data security breach points where data is vulnerable (for example, data entry, display, or transmission). Browser (or other) applications can also be automatically selected to ensure application compatibility and optimum process performance, in contrast to a user possibly selecting an incompatible or less-than-fully compatible application. In some cases, mobile devices can save application storage memory as known compatible applications can be selected and users can avoid the need to install other less-than-compatible applications.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method of invoking a third-party target application (app) from a mobile browser and automatically returning to the mobile browser upon completion without user intervention, the computer-implemented method comprising:
receiving, by a mobile device platform of a mobile device, first call data of a service process submitted by the mobile browser of the mobile device when a service call for the third-party target app installed on the mobile device is initiated, wherein the first call data comprises a custom parameter used to invoke the third-party target app and identification information of the mobile browser, and wherein the identification information comprises package name information of the mobile browser;
invoking, by the mobile device platform based on the custom parameter, the third-party target app to execute a corresponding target service;
transferring, by the mobile device platform, the identification information of the mobile browser to the third-party target app to cause the third-party target app to execute the corresponding target service;
receiving, by the mobile device platform, second call data indicating that the third-party target app executed the corresponding target service, the second call data including the package name information of the mobile browser submitted by the third-party target app, wherein the second call data comprises an intent constructed, based on the package name information of the mobile browser, by the third-party target app and used to invoke the mobile browser;
receiving, by the mobile device platform, the intent;
querying, by the mobile device platform, a system server for an activity component corresponding to the package name information of the mobile browser; and
invoking, by the mobile device platform, the activity component to return to the mobile browser, wherein invoking the activity component to return to the mobile browser includes ensuring application compatibility and eliminating data security breach points by automatically returning to the mobile browser instead of requiring manual selection of the mobile browser.

2. The computer-implemented method of claim 1, wherein receiving the first call data comprises:
retrieving identification information of the mobile browser when a service call for the third-party target app is initiated; and
submitting the first call data for the third-party target app.

3. The computer-implemented method of claim 2, wherein retrieving the identification information comprises:
retrieving user agent information of the mobile browser; and
querying, based on the user agent information of the mobile browser, the system server for the package name information of the mobile browser.

4. The computer-implemented method of claim 3, wherein the package name information of the mobile browser comprises version information of the mobile browser.

5. The computer-implemented method of claim 4, wherein:

the identification information of the mobile browser further comprises the user agent information of the mobile browser; and
in response to determining that the identification information of the mobile browser is the user agent information of the mobile browser, retrieving, based on the user agent information of the mobile browser and by the third-party target app, the package name information of the mobile browser.

6. The computer-implemented method of claim 5, wherein:
the first call data comprises a Universal Resource Locator (URL) defined based on a Schema protocol; and
submitting the first call data for the third-party target app comprises:
defining the URL based on the Schema protocol when the service call for the third-party target app is initiated;
parsing the URL to obtain the custom parameter and the identification information of the mobile browser;
encapsulating, in the URL, the custom parameter and the identification information of the mobile browser, wherein the custom parameter is used to invoke a target service page of the third-party target app; and
invoking a system interface to submit the URL.

7. A non-transitory, computer-readable medium storing one or more instructions executable by a computer system to perform operations of invoking a third-party target application (app) from a mobile browser and automatically returning to the mobile browser upon completion without user intervention, the operations comprising:
receiving, by a mobile device platform of a mobile device, first call data of a service process submitted by the mobile browser of the mobile device when a service call for the third-party target app installed on the mobile device is initiated, wherein the first call data comprises a custom parameter used to invoke the third-party target app and identification information of the mobile browser, and wherein the identification information comprises package name information of the mobile browser;
invoking, by the mobile device platform based on the custom parameter, the third-party target app to execute a corresponding target service;
transferring, by the mobile device platform, the identification information of the mobile browser to the third-party target app to cause the third-party target app to execute the corresponding target service;
receiving, by the mobile device platform, second call data indicating that the third-party target app executed the corresponding target service, the second call data including the package name information of the mobile browser submitted by the third-party target app, wherein the second call data comprises an intent constructed, based on the package name information of the mobile browser, by the third-party target app and used to invoke the mobile browser;
receiving, by the mobile device platform, the intent;
querying, by the mobile device platform, a system server for an activity component corresponding to the package name information of the mobile browser; and
invoking, by the mobile device platform, the activity component to return to the mobile browser, wherein invoking the activity component to return to the mobile browser includes ensuring application compatibility and eliminating data security breach points by automatically returning to the mobile browser instead of requiring manual selection of the mobile browser.

8. The non-transitory, computer-readable medium of claim 7, wherein receiving the first call data comprises:
retrieving identification information of the mobile browser when a service call for the third-party target app is initiated; and
submitting the first call data for the third-party target app.

9. The non-transitory, computer-readable medium of claim 8, wherein retrieving the identification information comprises:
retrieving user agent information of the mobile browser; and
querying, based on the user agent information of the mobile browser, the system server for the package name information of the mobile browser.

10. The non-transitory, computer-readable medium of claim 9, wherein the package name information of the mobile browser comprises version information of the mobile browser.

11. The non-transitory, computer-readable medium of claim 10, wherein:
the identification information of the mobile browser further comprises the user agent information of the mobile browser; and
in response to determining that the identification information of the mobile browser is the user agent information of the mobile browser, retrieving, based on the user agent information of the mobile browser and by the third-party target app, the package name information of the mobile browser.

12. The non-transitory, computer-readable medium of claim 11, wherein:
the first call data comprises a Universal Resource Locator (URL) defined based on a Schema protocol; and
submitting the first call data for the third-party target app comprises:
defining the URL based on the Schema protocol when the service call for the third-party target app is initiated;
parsing the URL to obtain the custom parameter and the identification information of the mobile browser;
encapsulating, in the URL, the custom parameter and the identification information of the mobile browser, wherein the custom parameter is used to invoke a target service page of the third-party target app; and
invoking a system interface to submit the URL.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations of invoking a third-party target application (app) from a mobile browser and automatically returning to the mobile browser upon completion without user intervention, the one or more operations comprising:
receiving, by a mobile device platform of a mobile device, first call data of a service process submitted by the mobile browser of the mobile device when a service call for the third-party target app installed on the mobile device is initiated, wherein the first call data comprises a custom parameter used to invoke the third-party target app and identification information of the mobile browser, and wherein the identification information comprises package name information of the mobile browser;
invoking, by the mobile device platform based on the custom parameter, the third-party target app to execute a corresponding target service;
transferring, by the mobile device platform, the identification information of the mobile browser to the third-party target app to cause the third-party target app to execute the corresponding target service;
receiving, by the mobile device platform, second call data indicating that the third-party target app executed the corresponding target service, the second call data including the package name information of the mobile browser submitted by the third-party target app, wherein the second call data comprises an intent constructed, based on the package name information of the mobile browser, by the third-party target app and used to invoke the mobile browser;
receiving, by the mobile device platform, the intent;
querying, by the mobile device platform, a system server for an activity component corresponding to the package name information of the mobile browser; and
invoking, by the mobile device platform, the activity component to return to the mobile browser, wherein invoking the activity component to return to the mobile browser includes ensuring application compatibility and eliminating data security breach points by automatically returning to the mobile browser instead of requiring manual selection of the mobile browser.

14. The computer-implemented system of claim 13, wherein receiving the first call data comprises:
retrieving identification information of the mobile browser when a service call for the third-party target app is initiated; and
submitting the first call data for the third-party target app.

15. The computer-implemented system of claim 14, wherein retrieving the identification information comprises:
retrieving user agent information of the mobile browser; and
querying, based on the user agent information of the mobile browser, the system server for the package name information of the mobile browser, wherein the package name information of the mobile browser comprises version information of the mobile browser.

16. The computer-implemented system of claim 15, wherein:
the identification information of the mobile browser further comprises the user agent information of the mobile browser; and
in response to determining that the identification information of the mobile browser is the user agent information of the mobile browser, retrieving, based on the user agent information of the mobile browser and by the third-party target app, the package name information of the mobile browser.

17. The computer-implemented system of claim 16, wherein:
the first call data comprises a Universal Resource Locator (URL) defined based on a Schema protocol; and
submitting the first call data for the third-party target app comprises:
defining the URL based on the Schema protocol when the service call for the third-party target app is initiated;

parsing the URL to obtain the custom parameter and the identification information of the mobile browser;
encapsulating, in the URL, the custom parameter and the identification information of the mobile browser, wherein the custom parameter is used to invoke a target service page of the third-party target app; and
invoking a system interface to submit the URL.

\* \* \* \* \*